US008825818B2

(12) United States Patent
Manor et al.

(10) Patent No.: US 8,825,818 B2
(45) Date of Patent: Sep. 2, 2014

(54) HOST INITIATED CONNECTION TO A DEVICE

(75) Inventors: Liron Manor, Haifa (IL); Alecsander Eitan, Haifa (IL); Vered Bar Bracha, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 12/615,411

(22) Filed: Nov. 10, 2009

(65) Prior Publication Data

US 2011/0113085 A1 May 12, 2011

(51) Int. Cl.
*G06F 15/177* (2006.01)
*G06F 15/173* (2006.01)
*G06F 15/16* (2006.01)
*H04W 76/02* (2009.01)
*H04L 29/08* (2006.01)
*H04W 8/00* (2009.01)
*H04W 84/18* (2009.01)

(52) U.S. Cl.
CPC .............. *H04W 76/02* (2013.01); *H04W 8/005* (2013.01); *H04W 84/18* (2013.01); *H04L 67/16* (2013.01); *H04L 67/303* (2013.01)
USPC ............ 709/222; 709/224; 709/225; 709/228

(58) Field of Classification Search
CPC ...... H04W 84/18; H04W 8/005; H04L 67/16; H04M 2250/02
USPC .................................. 709/222, 224, 225, 228
See application file for complete search history.

(56) References Cited

U.S. PATENT DOCUMENTS

| 6,604,140 | B1 | 8/2003 | Beck et al. |
| 6,633,757 | B1 | 10/2003 | Hermann et al. |
| 6,909,721 | B2 | 6/2005 | Ekberg et al. |
| 7,293,080 | B1 | 11/2007 | Clemm et al. |
| 7,379,958 | B2 | 5/2008 | Karhu |
| 7,386,459 | B2 | 6/2008 | English |
| 7,440,994 | B2 | 10/2008 | Harrow et al. |
| 7,457,304 | B2 | 11/2008 | Roh et al. |
| 7,477,634 | B1 | 1/2009 | McKown |
| 7,492,777 | B2 | 2/2009 | Ekberg et al. |
| 7,499,981 | B2 | 3/2009 | Harrow et al. |

(Continued)

FOREIGN PATENT DOCUMENTS

| CN | 1627760 A | 6/2005 |
| CN | 101341685 A | 1/2009 |

(Continued)

OTHER PUBLICATIONS

International Search Report and Written Opinion—PCT/US2010/056028, International Search Authority—European Patent Office—Mar. 4, 2011.

(Continued)

*Primary Examiner* — Hieu Hoang (57) ABSTRACT

Systems and methods for initiating a connection between a host and a device in a personal area network are described herein. In one embodiment, the method comprises broadcasting a request for services comprising information indicative of a type of device or service. The method further comprises receiving responses from a first device and a second device, each configured to service the request. The method further comprises connecting to the first device.

30 Claims, 6 Drawing Sheets

(56) References Cited

U.S. PATENT DOCUMENTS

| | | | |
|---|---|---|---|
| 7,516,201 B2 | 4/2009 | Kovacs et al. | |
| 7,546,363 B2 | 6/2009 | Harrow et al. | |
| 7,562,112 B2 | 7/2009 | Harrow et al. | |
| 7,590,097 B2 | 9/2009 | Ekberg et al. | |
| 7,631,033 B2 | 12/2009 | Zehler | |
| 7,647,012 B2 | 1/2010 | Yamada et al. | |
| 7,647,021 B2 | 1/2010 | Moore et al. | |
| 7,656,822 B1 | 2/2010 | AbdelAziz et al. | |
| 7,714,911 B2* | 5/2010 | Yoshida | 348/231.5 |
| 7,734,717 B2 | 6/2010 | Saarimaki et al. | |
| 7,769,837 B2* | 8/2010 | Nogawa et al. | 709/222 |
| 7,844,738 B2 | 11/2010 | Eytchison | |
| 7,904,561 B2 | 3/2011 | Chan et al. | |
| 7,921,155 B2 | 4/2011 | Harrow et al. | |
| 8,478,776 B2 | 7/2013 | Walton et al. | |
| 8,478,820 B2 | 7/2013 | Michaelis et al. | |
| 2003/0149917 A1* | 8/2003 | Smith et al. | 714/38 |
| 2004/0162871 A1 | 8/2004 | Pabla et al. | |
| 2006/0178924 A1 | 8/2006 | Yagiura | |
| 2006/0235958 A1* | 10/2006 | Motoyama | 709/223 |
| 2007/0060160 A1 | 3/2007 | Hur et al. | |
| 2007/0116031 A1 | 5/2007 | Chung et al. | |
| 2007/0141986 A1 | 6/2007 | Kuehnel et al. | |
| 2007/0141988 A1 | 6/2007 | Kuehnel et al. | |
| 2007/0153717 A1 | 7/2007 | Tervonen et al. | |
| 2007/0189322 A1* | 8/2007 | Hirose | 370/447 |
| 2007/0192300 A1 | 8/2007 | Reuther et al. | |
| 2007/0195746 A1 | 8/2007 | Ryu et al. | |
| 2007/0283018 A1* | 12/2007 | Yun | 709/226 |
| 2007/0283031 A1* | 12/2007 | Yoshida | 709/230 |
| 2007/0287438 A1* | 12/2007 | Hansen et al. | 455/417 |
| 2008/0090656 A1* | 4/2008 | Hartwig | 463/30 |
| 2008/0123558 A1* | 5/2008 | Chhabra | 370/254 |
| 2008/0139116 A1* | 6/2008 | Balgard et al. | 455/41.2 |
| 2008/0140835 A1 | 6/2008 | Bradley et al. | |
| 2008/0248402 A1 | 10/2008 | Krishnamoorthy | |
| 2008/0250160 A1 | 10/2008 | Hall | |
| 2008/0298329 A1 | 12/2008 | Mo et al. | |
| 2009/0029691 A1 | 1/2009 | Shen et al. | |
| 2009/0029699 A1 | 1/2009 | Luukkala et al. | |
| 2009/0031035 A1 | 1/2009 | Dharmaraju et al. | |
| 2009/0036063 A1 | 2/2009 | Zuniga et al. | |
| 2009/0059890 A1 | 3/2009 | Cordeiro et al. | |
| 2009/0061784 A1 | 3/2009 | Cordeiro | |
| 2009/0092105 A1 | 4/2009 | Chou | |
| 2009/0103568 A1 | 4/2009 | Garba et al. | |
| 2009/0106810 A1 | 4/2009 | Stoye et al. | |
| 2009/0157829 A1 | 6/2009 | Choi et al. | |
| 2009/0213771 A1 | 8/2009 | Celentano et al. | |
| 2009/0219947 A1 | 9/2009 | Kariya | |
| 2009/0227282 A1* | 9/2009 | Miyabayashi et al. | 455/552.1 |
| 2009/0237265 A1 | 9/2009 | Eguchi | |
| 2009/0274166 A1 | 11/2009 | Zhang et al. | |
| 2009/0290528 A1 | 11/2009 | Kwon et al. | |
| 2009/0323652 A1* | 12/2009 | Chen et al. | 370/338 |
| 2010/0054223 A1 | 3/2010 | Zhang et al. | |
| 2010/0085916 A1 | 4/2010 | Yu et al. | |
| 2010/0097946 A1 | 4/2010 | Celentano et al. | |
| 2010/0118785 A1 | 5/2010 | Sugaya | |
| 2010/0165925 A1 | 7/2010 | Del Prado Pavon et al. | |
| 2010/0260042 A1 | 10/2010 | Kwon et al. | |
| 2011/0044280 A1 | 2/2011 | Zhai | |
| 2011/0069187 A1* | 3/2011 | Yokota | 348/207.2 |
| 2011/0205962 A1 | 8/2011 | Das et al. | |
| 2012/0033585 A1 | 2/2012 | Michaelis et al. | |
| 2013/0281086 A1 | 10/2013 | Michaelis | |
| 2013/0281146 A1 | 10/2013 | Walton | |

FOREIGN PATENT DOCUMENTS

| | | | |
|---|---|---|---|
| EP | 1542409 A1 | 6/2005 | |
| EP | 1677462 A1 | 7/2006 | |
| EP | 1592177 B1 | 4/2007 | |
| JP | 2003284139 A | 10/2003 | |
| JP | 2005086570 A | 3/2005 | |
| JP | 2005167696 A | 6/2005 | |
| JP | 2005234877 A | 9/2005 | |
| JP | 2005318581 A | 11/2005 | |
| JP | 2006013811 A | 1/2006 | |
| JP | 2006171917 A | 6/2006 | |
| JP | 2006237658 | 9/2006 | |
| JP | 2007180839 A | 7/2007 | |
| JP | 2007234008 A | 9/2007 | |
| JP | 2009055246 A | 3/2009 | |
| JP | 2009055350 A | 3/2009 | |
| JP | 2009105750 A | 5/2009 | |
| JP | 2009521190 A | 5/2009 | |
| JP | 2009232259 A | 10/2009 | |
| JP | 2009537898 A | 10/2009 | |
| JP | 2010534980 A | 11/2010 | |
| JP | 2010537699 A | 12/2010 | |
| JP | 2011512102 A | 4/2011 | |
| JP | 2011521583 A | 7/2011 | |
| KR | 20040083238 A | 10/2004 | |
| KR | 20050108087 A | 11/2005 | |
| KR | 20090063732 A | 6/2009 | |
| TW | 527791 B | 4/2003 | |
| TW | 200801969 A | 1/2008 | |
| WO | WO-2007075961 A2 | 7/2007 | |
| WO | WO2007136622 A2 | 11/2007 | |
| WO | 2009015322 A2 | 1/2009 | |

OTHER PUBLICATIONS

Campo C et al: "PDP: A lightweight discovery protocol for local-scope interactions in wireless ad hoc networks", Computer Networks, Elsevier Science Publishers B.V., Amsterdam, NL, vol. 50, No. 17, Dec. 5, 2006, pp. 3264-3283, XP025182668, ISSN: 1389-1286, DOI: DOI:10.1016/J.COMNET.[retrieved on Dec. 5, 2006].

Chakraborty D et al: "Toward Distributed Service Discovery in Pervasive Computing Environments", IEEE Transactions on Mobile Computing, IEEE Service Center, Los Alamitos, CA, US LNKD-DOI:10.1109/TMC.2006.26, vol. 5, No. 2, Feb. 1, 2006, pp. 97-112, XP001545958, ISSN: 1536-1233.

Clausen T, et al., "Optimized Link State Routing Protocol", IETF draft, Oct. 2003.

ECMA International: "Standard ECMA-368 High Rate Ultra Wideband PHY and MAC Standard 2nd edition"Internet Citation Dec. 1, 2007, pp. I-VIII,1, XP002563778 Retrieved from the Internet:URL:http://www.ecmainternational.org/publications/files/ECMA-ST/ECMA-368 %202nd%20edition%20December%202007.pdf [retrieved on Jan. 18, 2010].

Fan et al: "Bandwidth allocation in UWB WPANs with ECMA-368 MAC", Computer Communications, Elsevier Science Publishers BV, Amsterdam, NL, vol. 32, No. 5, Mar. 27, 2009, pp. 954-960, XP026001994, ISSN: 0140-3664, DOI: DOI:10.1016/J.COMCOM. 2008.12.024 [retrieved on Dec. 30, 2008] abstract section 2. Proposed MAS allocation method.

Gunther Auer, "Contention Free Dynamic Slot Allocation in Cellular Networks," Sarnoff Symposium 2009.

Guttman C Perkins J Kempf Sun Microsystems E: "Service Templates and Service: Schemes; rfc2609.txt", IETF Standard, Internet Engineering Task Force, IETF, CH, Jun. 1, 1999, XP015008392, ISSN: 0000-0003.

Sud S, et al., "Enabling rapid wireless system composition through layer-discovery", IEEE Network, IEEE Service Center, New York, NY, US, vol. 22, No. 4, Jul. 1, 2008, pp. 14-20, XP011232023,ISSN, 0890-8044, DOI, DOI,10.1109/MNET.2008.4579766 abstract p. 16, left-hand column, paragraph 1—right-hand column, paragraph 1 p. 18, right-hand column, paragraph 3-6.

Ververidis C N, et al., "Service discovery for mobile Ad Hoc networks, a survey of issues and techniques", IEEE Communications Surveys, IEEE, New York, NY, US, vol. 10, No. 3, Jul. 1, 2008, pp. 30-45, XP011234560, ISSN, 1553-877X, DOI, DOI,10.1109/COMST.2008.4625803 p. 34, left-hand column, paragraph 4—p. 36, left-hand column, paragraph 2.

(56) References Cited

OTHER PUBLICATIONS

Wei Kuang Lai, "Mars: A multiple access scheme with sender driven and reception first for smart antenna in ad hoc networks", Wireless Communications and Mobile Computing, Wirel. Commun. Mob. Comput. 2009; 9: 197-208. Published online Apr. 21, 2008 in Wiley InterScience.

Zhensheng Zhang, "Pure Directional Transmission and Reception Algorithms in Wireless Ad Hoc Networks with Directional Antennas," 2005 IEEE International Conference on Communications, May 16-20, 2005, Seoul, Korea.

Taiwan Search Report—TW099138702—TIPO—Aug. 26, 2013.

\* cited by examiner

HOST INITIATED CONNECTION TO A DEVICE

BACKGROUND

1. Field

This application relates generally to personal area networks (PANs), and more specifically to a certified wireless universal serial bus (CWUSB) host configured to initiate a connection with CWUSB devices.

2. Background

A personal area network (PAN) is a communication network among multiple computing devices. In a typical PAN, a host (e.g., a personal computer) connects to one or more devices (e.g., printers, displays, projectors, storage devices, cameras, hands-free kits, human interface devices, etc.). Accordingly, a single host may access multiple devices. However, in a typical PAN, each device only connects to a single host. Further, once connected, no other host can connect to the device. Thus, a need exists for devices in a PAN to communicate with multiple hosts.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include host initiated connection to a device.

One aspect of the disclosure is a method for initiating a connection between a host and a device in a personal area network, the method comprising broadcasting a request for services comprising information indicative of a type of device or service; receiving responses from a first device and a second device, each configured to service the request; and connecting to the first device.

Another aspect of the disclosure is a method for initiating a connection between a host and a device in a personal area network, the method comprising receiving a request for services comprising information indicative of a type of device from a first host; determining if a first device is capable of servicing the request; connecting to the first host in response to the request; and servicing the request.

Another aspect of the disclosure is a method for initiating a connection between a host and a device, the method comprising broadcasting a request for services comprising information indicative of a type of device via a personal area network protocol; and reserving a time slot to communicate with one or more devices configured to service the request.

Another aspect of the disclosure is a host configured to initiate a connection with a device in a personal area network, the host comprising a transceiver configured to: broadcasting a request for services comprising information indicative of a type of device or service; and receiving responses from a first device and a second device, each configured to service the request; and a first processing circuit configured to initiate a connection with the first device.

Another aspect of the disclosure is a device configured to connect to a host in a personal area network, the device comprising a transceiver configured to receive a request for services comprising information indicative of a type of device from a first host; a first processing circuit configured to determine if the device is capable of servicing the request, wherein the transceiver is further configured to connect to the first host if the device is capable of servicing the request; and a second processing circuit configured to service the request.

Another aspect of the disclosure is a system for initiating a connection between a host and a device, the system comprising a transceiver configured to broadcast a request for services comprising information indicative of a type of device via a personal area network protocol; and a first processing circuit configured to reserve a time slot to communicate with one or more devices configured to service the request.

Another aspect of the disclosure is a computer program product, comprising computer-readable medium comprising code for causing a computer to broadcast a request for services comprising information indicative of a type of device or service; code for causing a computer to receive responses from a first device and a second device, each configured to service the request; and code for causing a computer to connect to the first device.

Another aspect of the disclosure is a computer program product, comprising computer-readable medium comprising code for causing a computer to receive a request for services comprising information indicative of a type of device from a first host; code for causing a computer to determine if a first device is capable of servicing the request; code for causing a computer to connect to the first host in response to the request; and code for causing a computer to service the request.

Another aspect of the disclosure is a computer program product, comprising computer-readable medium comprising code for causing a computer to broadcast a request for services comprising information indicative of a type of device via a personal area network protocol; and code for causing a computer to reserve a time slot to communicate with one or more devices configured to service the request.

Another aspect of the disclosure is a host configured to initiate a connection with a device in a personal area network, the host comprising means for broadcasting a request for services comprising information indicative of a type of device or service; means for receiving responses from a first device and a second device, each configured to service the request; and means for connecting to the first device.

Another aspect of the disclosure is a device configured to connect to a host in a personal area network, the device comprising means for receiving a request for services comprising information indicative of a type of device from a first host; means for determining if a first device is capable of servicing the request; means for connecting to the first host in response to the request; and means for servicing the request.

Another aspect of the disclosure is a system for initiating a connection between a host and a device, the system comprising means for broadcasting a request for services comprising information indicative of a type of device via a personal area network protocol; and means for reserving a time slot to communicate with one or more devices configured to service the request.

DETAILED DESCRIPTION

The word "exemplary" is used herein to mean "serving as an example, instance, or illustration." Any embodiment described herein as "exemplary" is not necessarily to be construed as preferred or advantageous over other embodiments. The techniques described herein may be used for various personal area networks such as universal serial bus (USB) networks, certified wireless USB (CWUSB) networks, FireWire networks, infrared data association (IrDA) networks, Bluetooth networks, ultra-wide band (UWB) networks, Z-Wave networks, ZigBee networks, etc. These various communication technologies are known in the art. For clarity, certain aspects of the methods and devices are described for a CWUSB system that implements a CWUSB network.

Traditionally, a CWUSB device is configured to initiate a connection with a CWUSB host. Once the CWUSB device is connected with the CWUSB host, the connection persists. Further, the CWUSB device may be configured to connect with a single CWUSB host at a time. Accordingly, other CWUSB hosts cannot connect to the CWUSB device.

The methods and devices described herein may be used for hosts and devices in a PAN. A host generally comprises a computing device (e.g., personal computer (PC), laptop, server, workstation, etc.) configured to connect to one or more devices (e.g., printers, displays, projectors, storage devices, cameras, hands-free kits, human interface devices, etc.).

The methods and devices described herein correspond to a wireless PAN host configured to initiate a connection with a device. The host may request a service from the device and then disconnect from the device. The device is then free to connect to other hosts. The host may communicate with one or more devices over one or more channels (e.g., frequency bands). In one embodiment, the host may be configured to communicate over a UWB channel.

Figure 1:
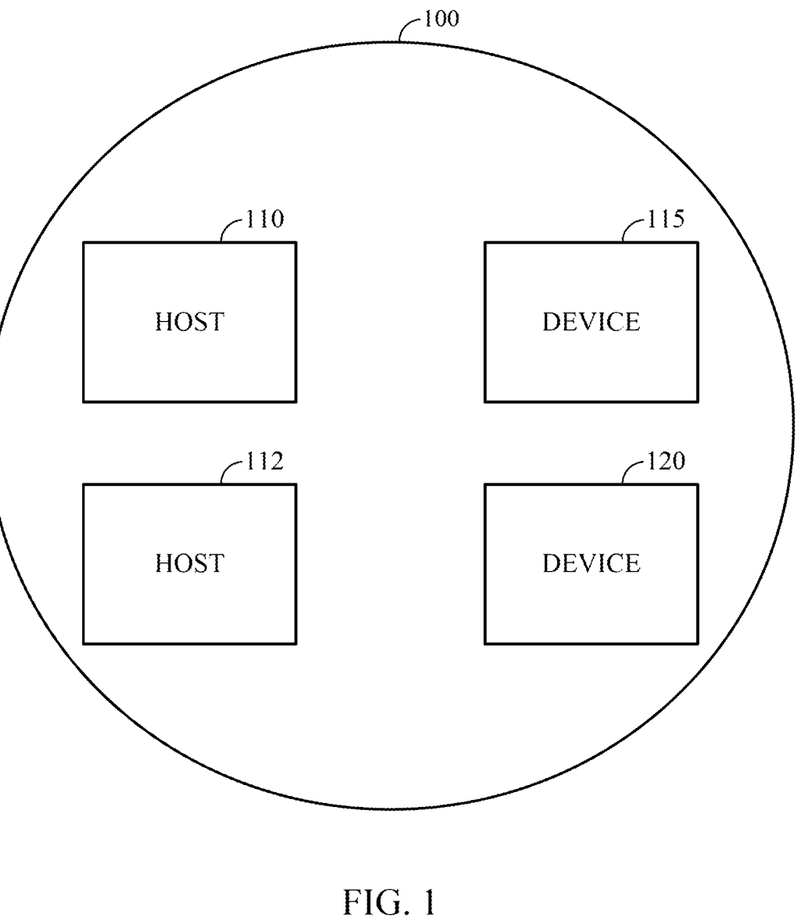
FIG. 1 is a diagram illustrating an exemplary personal area network.

FIG. 1 is a diagram illustrating an exemplary personal area network. The PAN 100 comprises a host 110 and a host 112 configured to communicate with one or more devices (e.g., devices 115, 120). The hosts 110, 112 are configured to broadcast messages (e.g., beacon signals) over a communication channel (e.g., a UWB channel) to devices in the PAN 100. Further, devices 115, 120 in the PAN 100 are configured to listen for messages broadcast over the communication channel. Further, the devices 115, 120 may be configured to connect to the host 110 and/or the host 112 and communicate over the communication channel. In one embodiment, the devices 115, 120 connect to the host 110 and/or the host 112 in response to receiving a particular broadcast message as described below. Though not shown, the PAN 100 may further comprise additional devices and/or hosts.

In one embodiment, before the devices 115, 120 initially communicate with hosts 110, 112, the devices 115, 120 and each of the hosts 110, 112 associate. For example, the host 110 and device 115 create a shared connection context (CC). The CC comprises a connection host identifier (CHID), a connection device identifier (CDID), and a connection key (CK). Once the CC is created during an association process, it may be saved in memory on both the host 110 and the device 115. The device 115 and the host 110 may exchange messages and create a CC by methods known in the art. The device 115 and/or the host 110 may utilize the CC during communication between each other. This allows for the host 110 and device 115 to identify each others transmissions and further provides secure communication.

In one embodiment, after association, the devices 115, 120 may listen for signals from associated hosts on a UWB communication channel. The host 110 may transmit a beacon signal requesting a service (e.g., a print job) over the communication channel. The beacon signal may comprise application specific information elements (ASIEs) requesting a specific service. The devices 115, 120 may "hear" (i.e., receive) the beacon signal and determine if the device is capable of servicing the request. One or more devices capable of servicing the request then connect to the host 110. In one embodiment, both device 115 and the device 120 are capable of servicing the request and connect to the host 110. In one embodiment, while connected to the host 110, the devices 115, 120 may not communicate with other hosts (e.g., host 112).

The host 110 may then choose a particular device to service the request. For example, the host 110 may choose the device 115 to service the request. The host 110 disconnects from devices not chosen (e.g., device 120) and requests the device 115 to service the request. After the device 115 services the request, the host 110 disconnects from the device 115. The disconnected devices 115, 120 are free to connect to additional hosts (e.g., host 112).

In one embodiment, a user of the host 110 selects the device to service the request. For example, a user of the host 110 may be presented with a list of one or more devices on a display of the host 110. The user may select a device from the one or more devices via an input of the host 110. In another embodiment, the host 110 automatically selects the device to service the request. For example, the host 110 may select the first device to connect to the host 110. In another example, the host 110 may further comprise a hierarchical list of devices and select the connected device nearest the top of the list to service the request.

Figure 2:
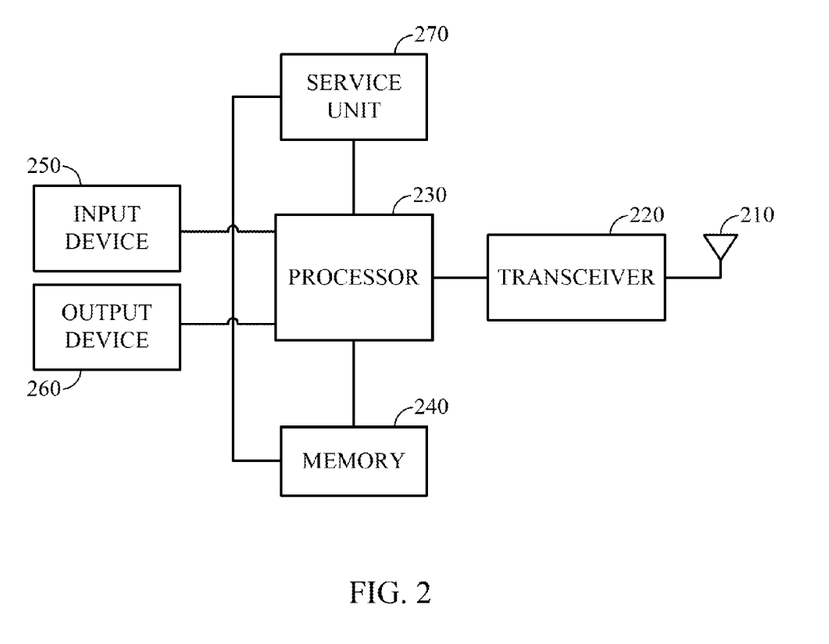
FIG. 2 is a functional block diagram of an exemplary device as shown in FIG. 1.

FIG. 2 is a functional block diagram of an exemplary device as shown in FIG. 1. As discussed above with respect to FIG. 1, the device 115 may communicate with the host 110 and/or the host 112 over a communication channel. The device 115 may transmit and receive data (e.g., beacons, requests) from the host 110 and/or the host 112 via an antenna 210. The antenna 210 may further be coupled to a transceiver 220. The transceiver 220 may be configured to modulate and demodulate data transmitted and received from the antenna 210. The transceiver 220 may further be coupled to a processor 230. The processor 230 may process data that is transmitted or received and/or control other components of the device 115. The processor 230 may further be coupled, via one or more buses, to read data from or write data to a memory 240. The processor 230 may further be coupled to an input device 250 and an output device 260 for, respectively, receiving input from and providing output to, a user of the device 115.

The processor 230 may further be coupled to a service unit 270. The service unit 270 may be configured to determine if the device 115 is capable of servicing a request received from a host. For example, the device 115 may receive a beacon from the host 110 requesting a service (e.g., a print job) at the antenna 210. The beacon may comprise ASIEs detailing the service requested. The transceiver 220 may demodulate the beacon signal. The processor 230 may then further process the beacon signal and/or or store information received in the beacon signal in the memory 240. The processor 230 may forward the beacon signal to the service unit 270. The service unit 270 may then determine if the device 115 is capable of servicing the request. For example, the service unit 270 may further be coupled to the memory 240, which may store information indicative of the capabilities (e.g., printer, fax, scanner, etc.) of the device 115. The service unit 270 may determine if the request from the host 110 may be serviced by one of the capabilities of the device 115. The service unit 270 may signal the processor 230 if the device 115 is capable of servicing the request. The processor 230 may further signal the transceiver 220 to initiate a connection with the host 110. For example, the processor 230 may generate a connection request message and send the message to the transceiver 220 to be transmitted to the host 110 via the antenna 210.

Further, the device 115 may be configured to receive a message from the host 110 requesting it to fulfill the service request. The device 115 may then fulfill the service request. For example, after the transceiver 220 initiates a connection with the host 110, the host 110 may send the message to the device 115. The device 115 may receive the request at the transceiver 220. The transceiver 220 may demodulate the message. The processor 230 may then further process the message and/or or store information received in the message in the memory 240. The processor 230 may fulfill the service request or forward the service request to an appropriate component of the device 115. For example, the processor 230 may forward the service request to the output device 260. The service request may comprise a print job, and the output device 260 may be a printer that outputs the print job.

After the service request is fulfilled, the processor 230 may further generate a return message indicating the service request has been fulfilled. The processor 230 may send the message to transceiver 220 which modulates the message. The transceiver then transmits the message to the host 110 via the antenna 210.

Although described separately, it is to be appreciated that functional blocks described with respect to the device 115 need not be separate structural elements. For example, the processor 230 and the memory 240 may be embodied in a single chip. The processor 330 may additionally, or in the alternative, contain memory, such as processor registers. Similarly, two or more of the processor 230, the transceiver 220, and the service unit 270 may be embodied in a single chip. Further, the transceiver 220 may comprise a transmitter, receiver, or both. In other embodiments, the transmitter and receiver are two separate components.

The memory 240 may comprise processor cache, including a multi-level hierarchical cache in which different levels have different capacities and access speeds. The memory 240 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

The input device 250 may comprise, but is not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, and/or a microphone (possibly coupled to audio processing software to, e.g., detect voice commands). The output device 260 may comprise, but is not limited to, visual output devices, including displays and printers, audio output devices, including speakers, headphones, earphones, and alarms, and/or haptic output devices, including force-feedback game controllers and vibrating devices.

One or more of the functional blocks and/or one or more combinations of the functional blocks described with respect to the device 115 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the device 115 may also be implemented as a combination of computing devices, e.g., a combination of a DSP and a microprocessor, a plurality of microprocessors, one or more microprocessors in conjunction with a DSP communication, or any other such configuration.

Figure 3:
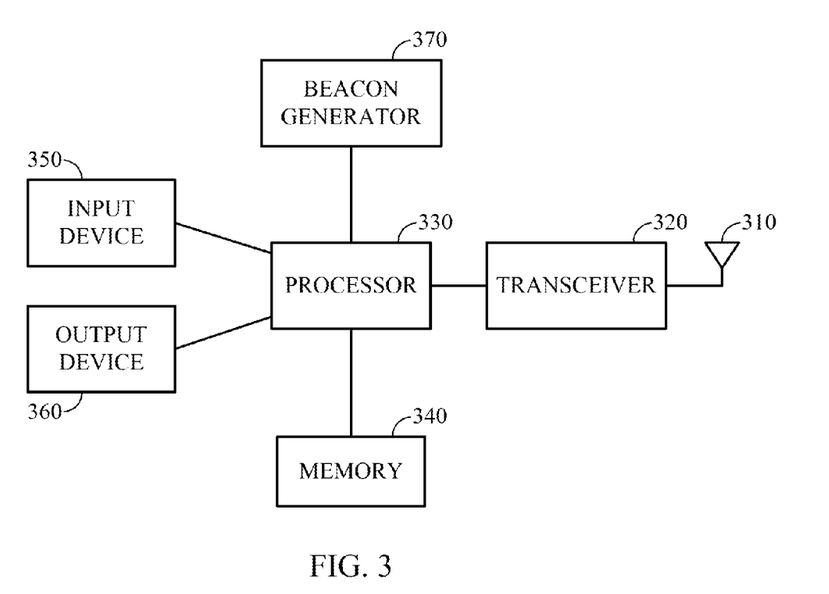
FIG. 3 is a functional block diagram of an exemplary host as shown in FIG. 1.

FIG. 3 is a functional block diagram of an exemplary host as shown in FIG. 1. As discussed above with respect to FIG. 1, the host 110 may communicate with one or more devices over one or more communication channels. The host 110 may transmit and receive data (e.g., beacons, requests) from the devices 115, 120 via an antenna 310. The antenna 310 may further be coupled to a transceiver 320. The transceiver 320 may be configured to modulate and demodulate data transmitted and received from the antenna 310. The transceiver 320 may further be coupled to a processor 330. The processor 330 may process data that is transmitted or received and/or control other components of the host 110. The processor 330 may further be coupled, via one or more buses, to read data from or write data to a memory 340. The processor 330 may further be coupled to an input device 350 and an output device 360 for, respectively, receiving input from and providing output to, a user of the host 110.

The processor 330 may further be coupled to a beacon generator 370. The beacon generator 370 may be configured to generate a beacon requesting a service (e.g., a print job). The beacon may comprise ASIEs. For example, the host 110 may receive input from a user via the input device 350. The input may be indicative of a request for a service. The input device 350 may send the input to the processor 330. The processor 330 may further determine the input is for a request for a particular service. The processor 330 may signal the beacon generator 370 to generate a beacon requesting the service. The beacon generator 370 may generate a beacon requesting the service and send the beacon to the processor 330. The processor 330 may further process the beacon for transmission. The transceiver 320 may modulate the beacon signal. The modulated beacon signal may be transmitted via the antenna 310.

In one embodiment, a connection request may be received from the device 115 and/or the device 120 in response to the beacon signal. The host 110 and the device 115 and/or the device 120 may connect. For example, the host 110 may receive connection requests from the device 115 and the device 120 via the antenna 310. The transceiver 320 may demodulate the connection requests and send the requests to the processor 330. The processor 330 may direct the transceiver to initiate a connection with the device 115 and a connection with the device 120.

Further, the host 110 may choose a connected device to service the request. For example, the output device 360 may display a list of connected devices capable of servicing the request to a user. The user may generate input selecting one of the connected devices by the input device 350. The processor 330 may receive information indicative of the input from the input device 350 and select a device accordingly. In another embodiment, the processor 330 may access a hierarchical list of devices for servicing the request stored in the memory 340.

The processor 330 may select the connected device that is the highest on the list. For example, the processor 330 may select the device 115.

The processor 330 may then signal the transceiver 320 to disconnect from each device not selected (e.g., the device 120). Further, the processor 330 may generate a message requesting the service be fulfilled by the selected device 115. The processor 330 may signal the transceiver 320 to modulate and transmit the message to the device 115 via the antenna 310.

The transceiver 320 may further be configured to disconnect from the device 115 after the request is fulfilled. For example, the host 110 may receive a return message from the device 115 indicating the request is fulfilled at the antenna 310. The transceiver 320 may demodulate the return message and forward the message to the processor 330. The processor 330 may process the message and signal the transceiver 320 to disconnect from the device 115.

Although described separately, it is to be appreciated that functional blocks described with respect to the host 110 need not be separate structural elements. For example, the processor 330 and the memory 340 may be embodied in a single chip. The processor 330 may additionally, or in the alternative, contain memory, such as processor registers. Similarly, two or more of the processor 330, the transceiver 320, and the beacon generator 370 may be embodied in a single chip. Further, the transceiver 320 may comprise a transmitter, receiver, or both. In other embodiments, the transmitter and receiver are two separate components.

The memory 340 may comprise processor cache, including a multi-level hierarchical cache in which different levels have different capacities and access speeds. The memory 340 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

The input device 350 may comprise, but is not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, and/or a microphone (possibly coupled to audio processing software to, e.g., detect voice commands). The output device 360 may comprise, but is not limited to, visual output devices, including displays and printers, audio output devices, including speakers, headphones, earphones, and alarms, and/or haptic output devices, including force-feedback game controllers and vibrating devices.

One or more of the functional blocks and/or one or more combinations of the functional blocks described with respect to the host 110 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the host 110 may also be implemented as a combination of computing devices, e.g., a combination of a DSP and a microprocessor, a plurality of microprocessors, one or more microprocessors in conjunction with a DSP communication, or any other such configuration.

Figure 4:
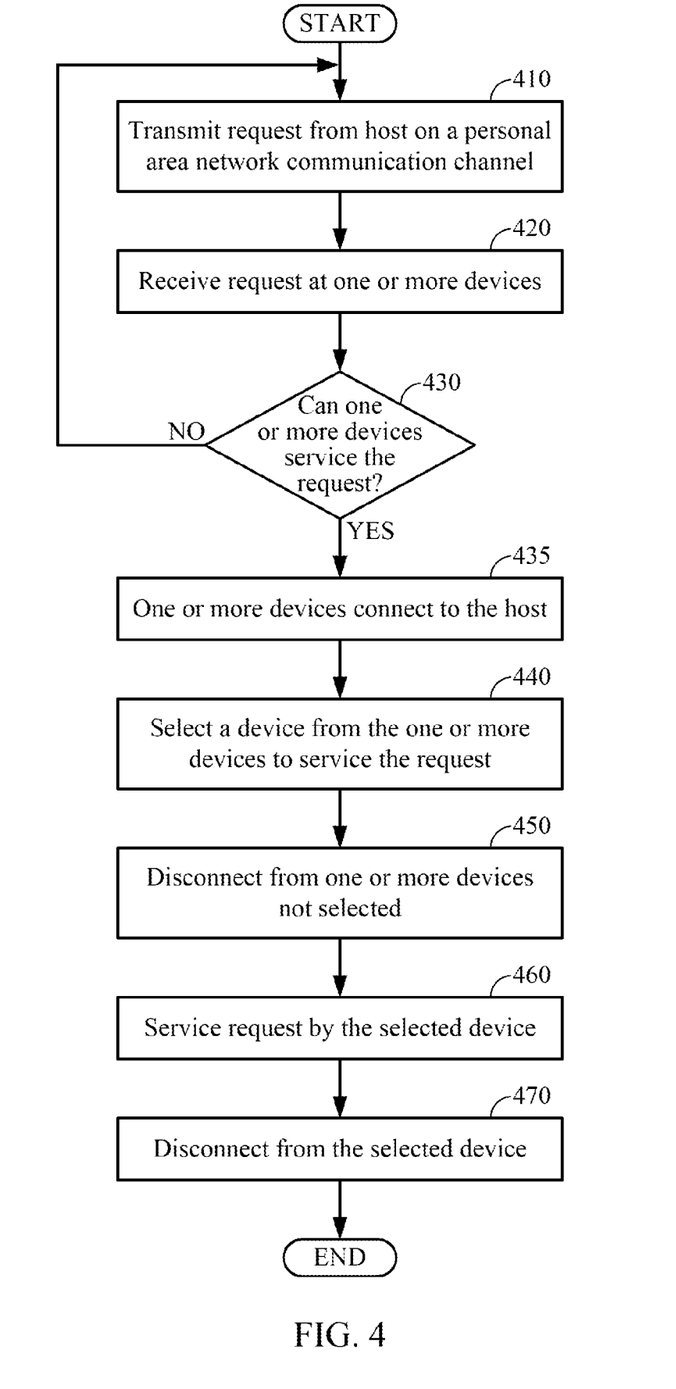
FIG. 4 is a flowchart of an exemplary process of a host initiating a connection with a device as shown in FIG. 1.

FIG. 4 is a flowchart of an exemplary process of a host initiating a connection with a device as shown in FIG. 1. At a step 410, the host 110 transmits a request for services on a personal area network communication channel. Further, at a step 420, one or more devices 112, 115 receive the request for services. Continuing at a step 430, each of the one or more devices 112, 115 determine if it is capable of servicing the request. If none of the one or more devices 112, 115 can service the request, the process returns to step 410. If the device 112 and/or the device 115 determines at the step 430 it can service the request, the process continues to a step 435. At the step 435, each device that can service the request connects to the host 110. Next, at a step 440, the host 110 selects a device from the one or more connected devices to service the request. Further at a step 450 the host 110 disconnects from the one or more devices not selected at the step 440. Continuing at a step 460, the selected device services the request. Next at a step 470, the host 110 disconnects from the selected device.

Figure 5:
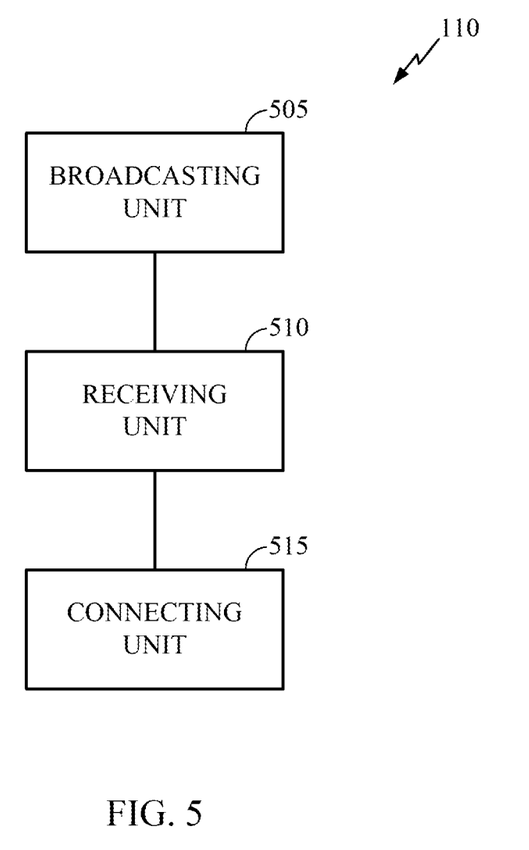
FIG. 5 is a functional block diagram of another exemplary host as shown in FIG. 1.
Figure 6:
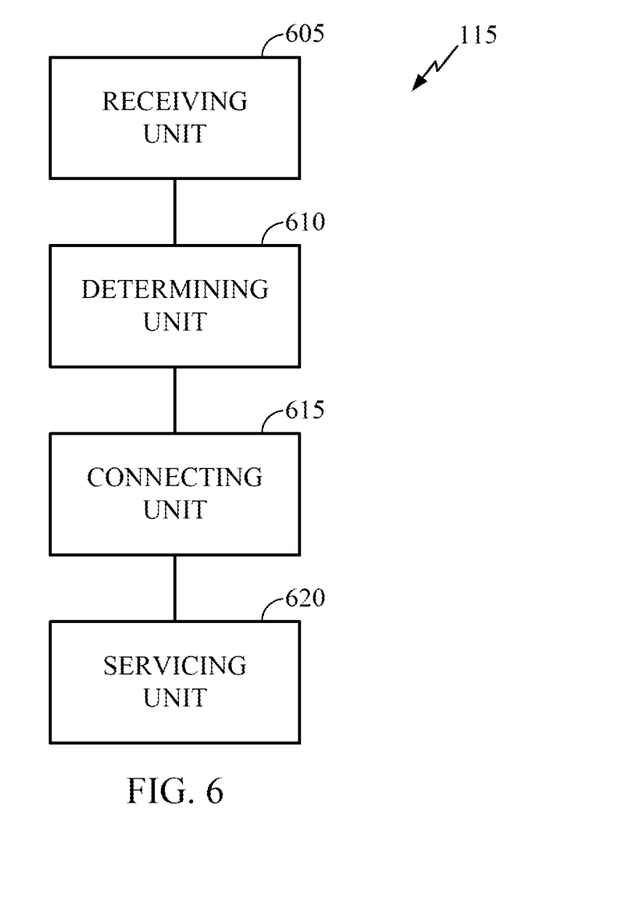
FIG. 6 is a functional block diagram of another exemplary device as shown in FIG. 1.
Figure 7:
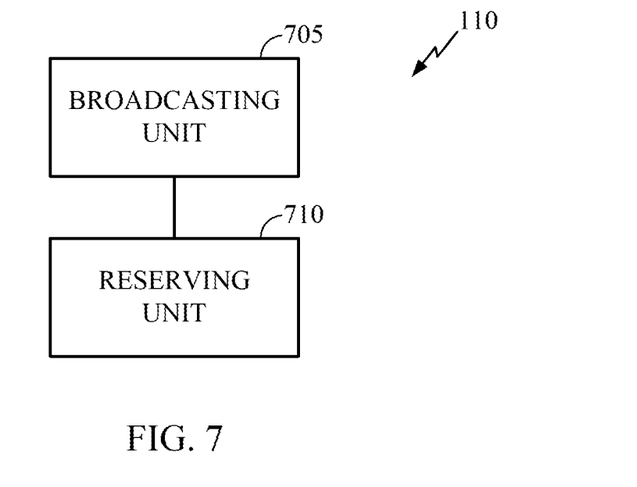
FIG. 7 is a functional block diagram of yet another exemplary host as shown in FIG. 1.

The functionality described herein (e.g., with regard to one or more of the accompanying figures) may correspond in some aspects to similarly designated "means for" functionality in the appended claims. Referring to FIGS. 5-7, the host 110 and the device 115 are represented as a series of interrelated functional modules.

FIG. 5 is a functional block diagram of another exemplary host as shown in FIG. 1. As shown, the host 110 may comprise a broadcasting unit 505, a receiving unit 510, and a connecting unit 515. The broadcasting unit 505 may correspond at least in some aspects to, for example, a beacon generator, a processor, and/or a transceiver as discussed herein. The receiving unit 510 may correspond at least in some aspects to, for example, a transceiver and/or a processor as discussed herein. The connecting unit 515 may correspond at least in some aspects to, for example, a transceiver and/or a processor as discussed herein.

FIG. 6 is a functional block diagram of another exemplary device as shown in FIG. 1. As shown, the device 115 may comprise a receiving unit 605, a determining unit 610, a connecting unit 615, and a servicing unit 620. The receiving unit 605 may correspond at least in some aspects to, for example, a transceiver as discussed herein. The determining unit 610 may correspond at least in some aspects to, for example, a memory, a service unit and/or a processor as discussed herein. The connecting unit 615 may correspond at least in some aspects to, for example, a transceiver and/or a processor as discussed herein. The servicing unit 620 may correspond at least in some aspects to, for example, a service unit, an output device, and/or a processor as discussed herein.

FIG. 7 is a functional block diagram of yet another exemplary host as shown in FIG. 1. As shown, the host 110 may comprise a broadcasting unit 705 and a reserving unit 710. The broadcasting unit 705 may correspond at least in some aspects to, for example, a beacon generator, a processor, and/or a transceiver as discussed herein. The reserving unit 710 may correspond at least in some aspects to, for example, a processor as discussed herein.

The functionality of the modules of FIGS. 5-7 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

While the specification describes particular examples of the present invention, those of ordinary skill can devise variations of the present invention without departing from the inventive concept. For example, the teachings herein refer to networks with femto cells and macro cells but are equally applicable to networks with other topologies.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for initiating a connection between a host and a first device of a plurality of devices in a wireless personal area network, the method comprising:
   communicating with the plurality of devices in the wireless personal area network to establish an association between the host and the plurality of devices;
   broadcasting a beacon signal comprising application specific information elements (ASIEs), the ASIEs comprising a request for service from the host to the plurality of devices over the wireless personal area network, the request for service comprising information indicative of a type of device or service, wherein the beacon signal is generated based on input from at least one or more of the plurality of devices;
   receiving responses from the first device and a second device of the plurality of devices, each of the first device and the second device configured to service the request;
   establishing a connection between the host and each of the first device and the second device based on the received responses;
   selecting the first device to service the request; and disconnecting from the second device based on the selection of the first device to service the request.

2. The method of claim 1, further comprising transmitting data to the first device.

3. The method of claim 1, wherein the first device comprises a wireless universal serial bus device.

4. The method of claim 1, wherein the first device comprises a Bluetooth device.

5. The method of claim 1, wherein the information comprises application specific information elements.

6. The method of claim 1, wherein the type of device comprises at least one of a wireless printer, a wireless display, a wireless projector, a wireless storage, a wireless camera, a wireless hands-free kit, and a wireless human interface device.

7. A method for initiating a connection between a host and a first device of a plurality of devices in a wireless personal area network, the method comprising:
communicating with the plurality of devices in the wireless personal area network to establish an association between the host and the plurality of devices;
broadcasting a beacon signal comprising application specific information elements (ASIEs), the ASIEs comprising a request for service from the host to the plurality of devices over the wireless personal area network, the request for service comprising information indicative of a type of device or service, wherein the beacon signal is generated based on input from at least one or more of the plurality of devices;
receiving responses from the first device and a second device of the plurality of devices, each of the first device and the second device configured to service the request;
establishing a connection between the host and each of the first device and the second
device by reserving a time slot to communicate with the first and second devices; selecting the first device to service the request; and
disconnecting from the second device based on the selection of the first device to service the request.

8. The method of claim 7, further comprising receiving a message from each of the one or more devices configured to service the request.

9. The method of claim 7, further comprising: receiving the requested service from the first device; and
disconnecting from the first device in response to receiving the requested service from the first device.

10. The method of claim 9, further comprising disconnection from the first device after the request is serviced.

11. A host configured to initiate a connection with a first device of a plurality of devices in a wireless personal area network, the host comprising:
a transceiver configured to:
communicate with the plurality of devices in the wireless personal area network to establish an association between the host and the plurality of devices
broadcast a beacon signal comprising application specific information elements (ASIEs) the ASIEs comprising a request for service from the host to the plurality of devices over the wireless personal area network, the request for service comprising information indicative of a type of device or service, wherein the beacon signal is generated based on input from at least one or more of the plurality of devices; and
receive responses from the first device and a second device of the plurality of devices, each of the first device and the second device configured to service the request; and a first processing circuit configured to:

initiate a connection between the host and each of the first device and the second device based on the received responses;
select the first device to service the request; and
disconnect from the second device based on the selection of the first device to service the request.

12. The host of claim 11, wherein the transceiver is further configured to transmit data to the first device.

13. The host of claim 11, wherein the first device comprises a wireless universal serial bus device.

14. The host of claim 11, wherein the first device comprises a Bluetooth device.

15. The host of claim 11, wherein the information comprises application specific information elements.

16. The host of claim 11, wherein the type of device comprises at least one of a wireless printer, a wireless display, a wireless projector, a wireless storage, a wireless camera, a wireless hands-free kit, and a wireless human interface device.

17. A system for initiating a connection between a host and a first device of a plurality of devices in a wireless personal area network, the system comprising:
a transceiver configured to:
communicate with the plurality of devices in the wireless personal area network to establish an association between the host and the plurality of devices;
broadcast a beacon signal comprising application specific information elements (ASIEs) the ASIEs comprising a request for service from the host to the plurality of devices over the wireless personal area network, the request for service comprising information indicative of a type of device or service, wherein the beacon signal is generated based on input from at least one or more of the plurality of devices; and
a first processing circuit configured to:
receive responses from the first device and a second device of the plurality of devices each of the first device and the second device configured to service the request;
establish a connection between the host and each of the first device and the second device by reserving a time slot to communicate with the first device and the second device;
select the first device to service the request; and
disconnect from the second device based on the selection of the first device to service the request.

18. The system of claim 17, wherein the transceiver is further configured to receive a message from each of the first device and the second device configured to service the request.

19. The system of claim 17, wherein the transceiver is further configured to communicate with the first device over the reserved time slot.

20. The system of claim 17, wherein the transceiver is further configured to disconnect from the first device after the request is serviced.

21. A computer program product, comprising:
a non-transitory computer-readable medium comprising:
code for causing a computer to communicate with a plurality of devices in a wireless personal area network to establish an association between a host and the plurality of devices;
code for causing the computer to broadcast a beacon signal comprising application specific information elements (ASIEs), the ASIEs comprising a request for service from the host to the plurality of devices over the wireless personal area network, the request for service comprising information indicative of a type of device or service, wherein the beacon signal is generated based on input from at least one or more of the plurality of devices;

code for causing the computer to receive responses from a first device and a second device of the plurality of devices, each of the first device and the second device configured to service the request;

code for establishing a connection between the host and each of the first device and the second device based on the received responses;

code for selecting the first device to service the request; and code for causing the computer to disconnect from the second device based on the selection of the first device to service the request.

22. A computer program product, comprising:

a non-transitory computer-readable medium comprising:

code for causing a computer to communicate with a plurality of devices in a wireless personal area network to establish an association between a host and the plurality of devices;

code for causing the computer to broadcast a beacon signal comprising application specific information elements (ASIEs), the ASIEs comprising a request for service from the host to the plurality of devices over the wireless personal area network, the request for service comprising information indicative of a type of device or service, wherein the beacon signal is generated based on input from at least one or more of the plurality of devices;

code for causing the computer to receive responses from a first device and a second device of the plurality of devices, each of the first device and the second device configured to service the request;

code for causing the computer to establish a connection between the host and each of the first device and the second device by reserving a time slot to communicate with the first and second devices;

code for causing the computer to select the first device to service the request; and code for causing the computer to disconnect from the second device based on the selection of the first device to service the request.

23. A host configured to initiate a connection with a first device of a plurality of devices in a wireless personal area network, the host comprising:

means for communicating with the plurality of devices in the wireless personal area network to establish an association between the host and the plurality of devices;

means for broadcasting a beacon signal comprising application specific information elements (ASIEs), the ASIEs comprising a request for service from the host to the plurality of devices over the wireless personal area network, the request for service comprising information indicative of a type of device or service, wherein the beacon signal is generated based on input from at least one or more of the plurality of devices;

means for receiving responses from the first device and a second device of the plurality of devices, each of the first device and the second device configured to service the request;

means for establishing a connection between the host and each of the first device and the second device based on the received responses;

means for selecting the first device to service the request; and means for disconnecting from the second device based on the selection of the first device to service the request.

24. A system for initiating a connection between a host and a first device of a plurality of devices in a wireless personal area network, the system comprising:

means for communicating with the plurality of devices in the wireless personal area network to establish an association between the host and the plurality of devices;

means for broadcasting a beacon signal comprising application specific information elements (ASIEs), the ASIEs comprising a request for service from the host to the plurality of devices over the wireless personal area network, the request for service comprising information indicative of a type of device or service, wherein the beacon signal is generated based on input from at least one or more of the plurality of devices;

means for receiving responses from the first device and a second device of the plurality of devices, each of the first device and the second device configured to service the request;

means for establishing a connection between the host and each of the first device and the second device by reserving a time slot to communicate with the first and second devices; means for selecting the first device to service the request; and means for disconnecting from the second device based on the selection of the first device to service the request.

25. The method of claim 1, further comprising:

receiving the requested service from the first device; and disconnecting from the first device in response to receiving the requested service from the first device.

26. The method of claim 1, wherein the first device and the second device are configured to connect with a single host device at a time.

27. The method of claim 1, further comprising: allowing the second device to communicate with other hosts after disconnecting the second device.

28. The host of claim 23, further comprising: means for receiving the requested service from the first device; and means for disconnecting from the first device in response to receiving the requested service from the first device.

29. The host of claim 23, wherein the first device and the second device are configured to connect with a single host device at a time.

30. The host of claim 3, further comprising:

means for allowing the second device to communicate with other hosts after disconnecting the second device.

* * * * *